Oct. 28, 1969  M. F. WEBSTER  3,475,046
ADJUSTABLE RACK BODIES FOR PICKUP TRUCKS
Filed Aug. 28, 1967  2 Sheets-Sheet 1
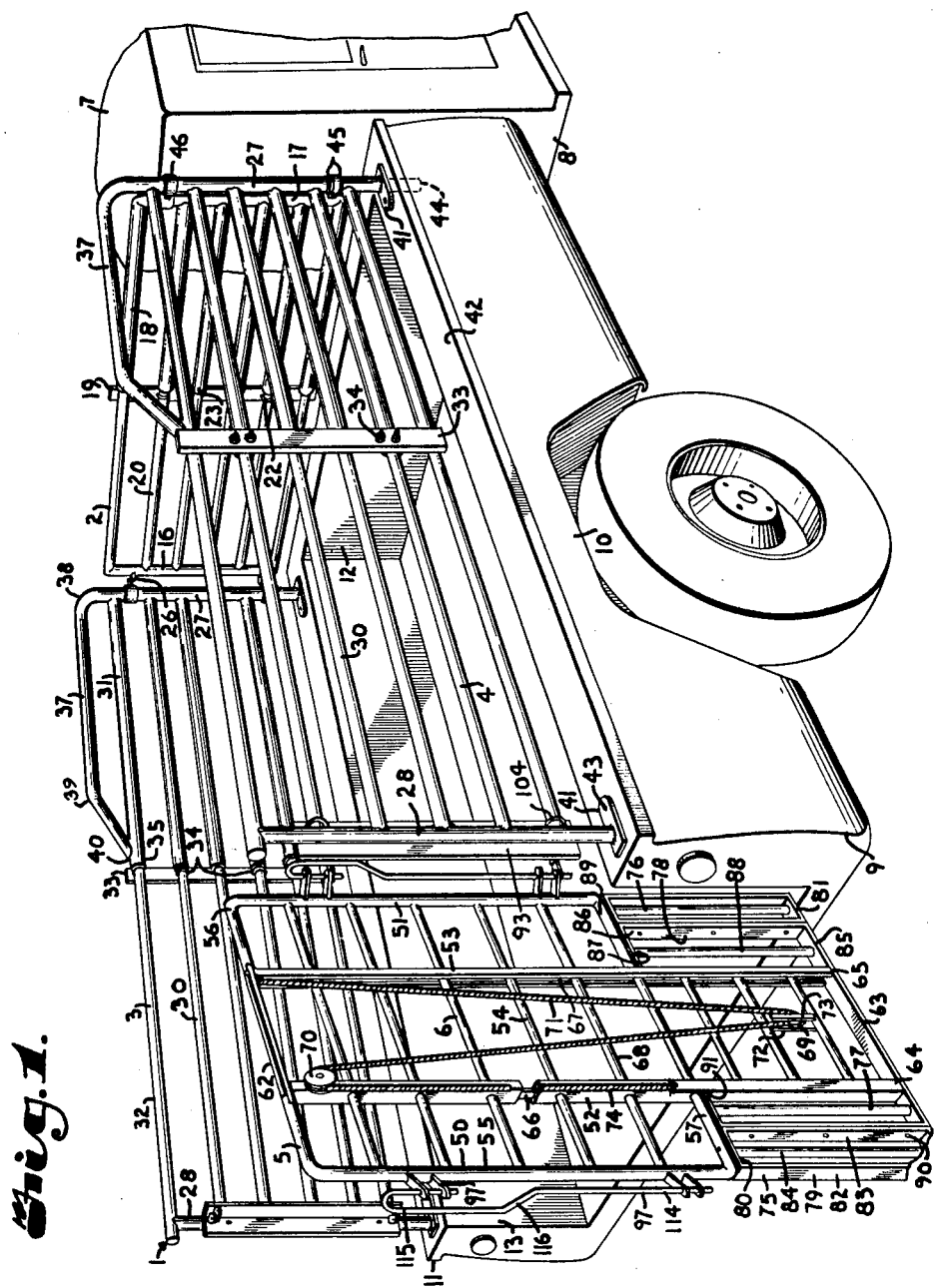
INVENTOR.
MURLE F. WEBSTER
BY
Fishburn, Gold & Litman
ATTORNEYS

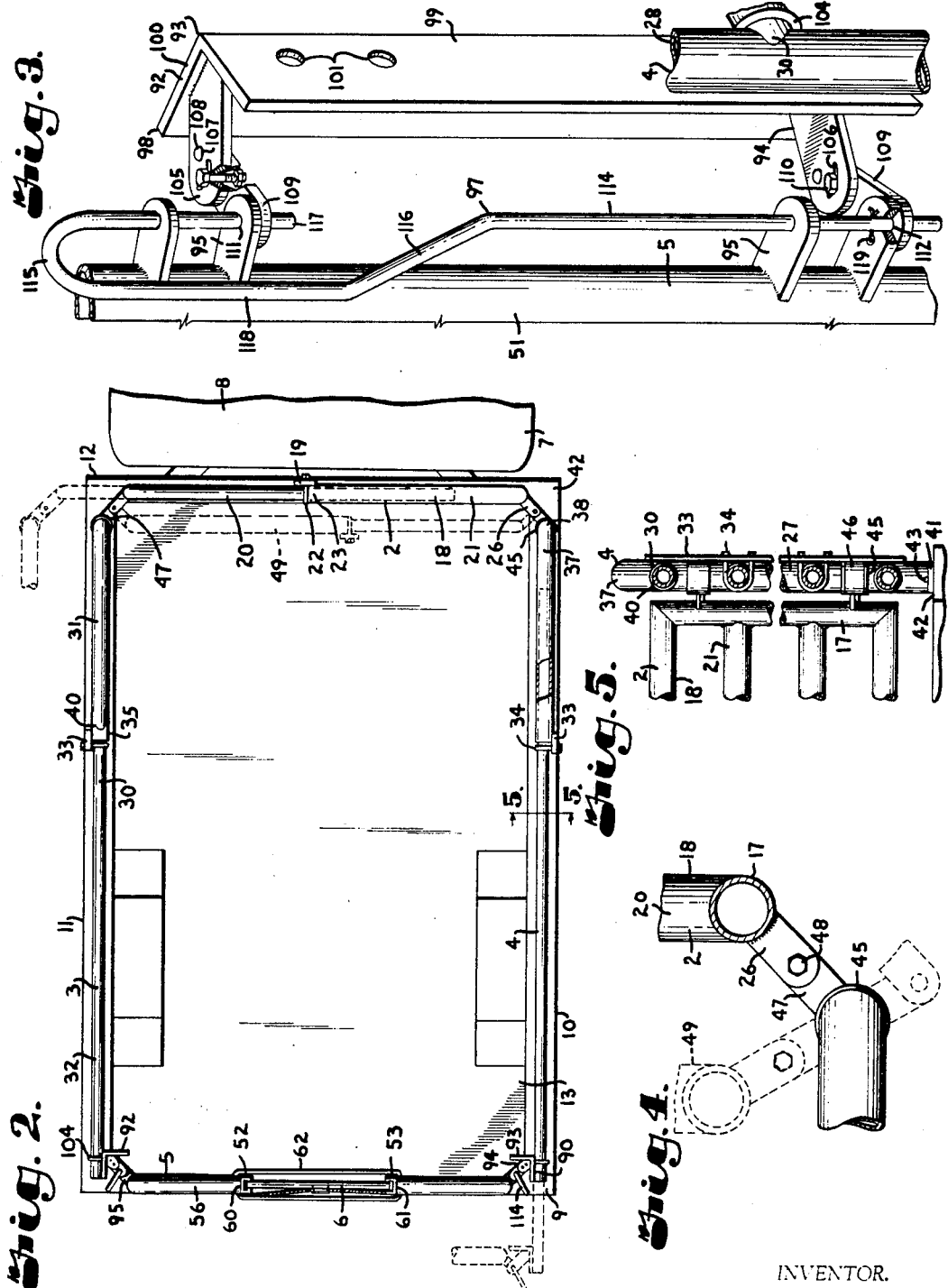

United States Patent Office 3,475,046
Patented Oct. 28, 1969

3,475,046
ADJUSTABLE RACK BODIES FOR PICKUP TRUCKS
Murle F. Webster, c/o W. W. Manufacturing Company, Inc., P.O. Box 728, Dodge City, Kans. 67801
Filed Aug. 28, 1967, Ser. No. 663,778
Int. Cl. B60p *3/04;* B62d *33/04*
U.S. Cl. 296—3    8 Claims

ABSTRACT OF THE DISCLOSURE

An adjustable stock rack for transporting livestock such as horses and cattle which is adapted to be mounted on the various models of pickup trucks having different widths and lengths. The rack consists of a front end panel, a pair of side walls, a swinging rear gate and an overhead gate in the rear gate. The side walls and front end panel may be adjustable in length to fit various lengths and widths of truck bodies. An adjustable connection of the front end panel to the front end of each side wall is arranged whereby with a single width end panel the spacing between the front ends of the side walls is adjustable for different width bodies. Also the position of the front end panel forwardly and rearwardly relative to the front ends of the side walls is variable to accommodate cab positions in different makes and sizes of pickup trucks. Adjustable connections and hinges are mounted on each end of the rear gate and on the rear end of each side wall to accommodate different spacing between the rear ends of the side walls and to adjust the position of the rear gate relative to tail gate of the pickup truck.

---

Heretofore, stock racks have been made to fit specific models of pickup trucks and, therefore, not adjustable for the various models and sizes of bodies. Dealers in stock racks were required to stock numerous variations of widths and lengths and even with large inventories might not be able to supply a specific size.

The principal objects of the present invention are to provide an adjustable stock rack adapted to be mounted on and fit substantially all sizes and shapes of bodies and accommodate the various cab positions of the various standard models of pickup trucks; to provide such a stock rack which is lightweight and durable; to provide such a stock rack having a front end panel, a pair of longitudinally adjustable side walls and adjustable connections therebetween for accommodating different side wall spacing and different front end wall positions forwardly and rearwardly of the front end of the side walls; to provide such a structure with a swinging rear gate adapted to be swung from either side wall; to provide the rear gate with a vertically movable or overhead gate; to provide such a structure with adjustable connections between the rear gate mounting and rear ends of the side walls to accommodate different widths and different forward and rearward locations of said rear gate relative to the side walls; to provide such a stock rack of all metal construction, attractive design, of simple and strong construction and which is economical to manufacture.

Other objects and advantages of this invention will become apparent from the following description taken in connection with the accompanying drawings wherein are set forth by way of illustration and example certain embodiments of this invention.

FIG. 1 is a perspective view of the stock rack in position on a pickup truck with the swinging rear end gate open.

FIG. 2 is a plan of the stock rack in position on a pick-up truck and showing adjustable positions in broken lines.

FIG. 3 is an enlarged fragmentary perspective view of the rear gate mounting and adjustable hinge structure.

FIG. 4 is a fragmentary plan view of the adjustable connection between a side wall and the front end panel with alternate positions shown in broken lines.

FIG. 5 is a vertical sectional view through a side member taken on line 5—5, FIG. 2.

Referring more in detail to the drawings:

The reference numeral 1 generally designates an adjustable stock rack which consists of a front end panel 2, a pair of longitudinally adjustable side members or walls 3 and 4, a rear end gate 5, and an overhead gate 6 in the rear end gate 5. The structure is particularly adapted to be installed on pickup trucks to transport livestock such as horses and cattle and may also be used for hauling other items wherein height of walls is desirable. The stock rack 1 is adjustable longitudinally to fit the various lengths of the different models of pickup bodies or boxes and the spacing between the sidewalls 3 and 4 is adjustable to fit the various widths of the different models of pickup bodies or boxes. The front end panel 2 and the rear end gate 5 are adapted for selective positioning relative to the cab 7 and rear end respectively of a pickup truck 8.

In the illustrated structure the stock rack 1 is mounted on the box 9 of the pickup truck 8. The box 9 has a pair of side panels 10 and 11, a front panel 12, a bed 13, and a pair of wheel wells 14 and 15 in the bed 13.

The front end panel 2 may be of any suitable structure with end members 16 and 17 and may be of solid or open construction. In the structure illustrated the end members 16 and 17 are tubular posts and the panel 2 includes a plurality of spaced tubular horizontal rails 18 extending between said posts. Certain of the rails 18 are connected to an intermediate brace 19 that extends substantially vertically approximately midway between the posts 16 and 17. The front end panel 2 may be constructed as a unit of fixed length and accommodate a range of different box widths, but for maximum variation it is preferred that the horizontal rails 18 each consist of a telescoping pair of rail members 20 and 21 fixed to and extending from the posts 16 and 17 respectively and with the rail member 20 received within the rail member 21. The brace 19 illustrated is an elongate flat bar which is fixed to rail members 21 by welding and has suitable fastening devices such as U-bolts 22. In the adjustable length panel the U-bolts 22 are mounted in the brace 19 and embrace the rail members 20 with the free end 23 of the rail members 21 substantially abutting therewith holding the panel 2 from contracting or shortening. A plurality of elongate outstanding arms 26 are suitably secured to each of the end posts 16 and 17. In the illustrated structure the arms 26 are welded to the end posts 16 and 17 and extend in diverging relation with each being at a forty-five degree angle to the plane of the rails 18, said arms preferably being arranged with one near the top and one near the bottom of each end post 16 and 17. In the structure illustrated the panel 2 is supported by the arms 26 from the side walls, there being no direct connection between the panel 2 and the box 9 of the truck.

The side walls 3 and 4 may be of any suitable structure of either solid or open construction, however, it is preferred each be tubular metal for strength with lightness in weight. Each of the side walls 3 and 4 has a tubular front end post 27 and a tubular rear end post 28 and a plurality of tubular horizontal rails 30. The side walls 3 and 4 are longitudinally adjustable to conform to the various box lengths of different models of pick-up trucks and to provide said adjustability, the rails 30 are each of telescoping pairs of rail members 31 and 32 fixed to and extending from the posts 27 and 28 respectively with the rail member 32 received within the rail member 31. The rails 30 are reinforced and held spaced apart by an intermediate brace 33 in the form of an elongate flat bar which is suitably secured to said rails as by U-bolts 34. It is preferred that the braces 33 be secured by the U-bolts 34 embracing the rail member 32 at the free end 35 of the rail members 31 thereby holding the side walls 3 and 4 from contracting or shortening.

The length of the stock rack 1 may be substantially adjusted, as for example, from a minimum length of sixty-six inches to a maximum length of one hundred inches as a result of action of the telescoping pairs of rail members 31 and 32.

In the illustrated structure each of the side walls have additional height in the forward portion by the front end posts 27 having an extension 37 which has a right angle bend 38 and then extends above and parallel to the top rail 31 and then inclines downwardly as at 39 to the top rail member 31 where it is secured as at 40. Each of the front end posts 27 and the rear end posts 28 has a support flange 41 extending outwardly from the lower portions thereof. The flanges 41 engage the top 42 of the side panels 10 and 11 and may be suitably fastened thereto as by bolts or screws 43. The posts 27 and 28 on the flange 41 each have extensions or stakes 44 depending therefrom for extending into pockets or sockets in the side panels 10 and 11 to provide additional supports for the stock rack 1.

A plurality of annular flanges 45 are suitably secured to the front end posts 27 in vertical spaced relation. A plurality of sleeves 46 are installed on the front end posts 27 with at least one of the sleeves 46 being retained in vertical position between a pair of flanges 45. In the illustrated structure two sleeves 46 are mounted on each front end post 27 with the lower sleeve 46 being retained between a pair of flanges 45 as shown in FIG. 5. Each sleeve 46 has an elongate outstanding ear 47 with each ear 47 pivotally connected to one of the arms 26 by a bolt or fastener 48. When the bolts 48 are tightened the sleeves 46 are prevented from rotating. The lateral spacing between the side walls 3 and 4 at the front end posts 27 for a particular width of pickup box is accommodated by the sleeves 46 rotating on the front end posts 27 to provide the proper spacing of the bolts 48 in the ears 47 to connect with the arm 26. The sleeves 46 rotate about the front end posts 27 with the limits being an end post 16 or 17 engaging the rail members 31 or the rail members 20 or 21 engaging the end posts 27. The sleeves 46 turn through an angle of approximately two hundred ten degrees (210°) which allows a variation in width, as for example, from a minimum width of sixty-eight inches to a maximum width of seventy-three inches. When additional width is desired the telescoping rail members 20 and 21 are adjusted to the desired width and the U-bolts 22 are then secured in position to prevent expanding or contracting of the front end panel 2.

A relatively rigid connection is obtained when the front end posts 27 are in position, the brace 19 is installed with U-bolts 22 adjacent the free end 23 of the rail members 21, and the arms 26 are in position relative to the ears 47. The U-bolts 22 prevent the front end panel 2 from shortening by bearing against the free end 23 of the respectively rail members 21 and the cooperation of the arms 26 and the ears 47 on the side walls 3 and 4 prevent the front end panel 2 from extending when fasteners 48 are tightened.

When the cab 7 extends into the box 9, the front end panel 2 is placed in position 49 as shown in broken lines in FIGS. 2 and 4. The position 49 has the front end panel 2 turned end-for-end from the position shown in FIG. 1, so the arms 26 point toward instead of away from the cab 7.

The rear end gate 5 closes the rear end of the rack and in the illustrated structure consists of tubular end posts 50 and 51, a pair of laterally spaced vertically arranged intermediate channel shaped guide members 52 and 53 to guide the overhead gate 6 therein, and a plurality of horizontal rails 54. The rails 54 are suitably secured in vertical spaced relation between end post 50 and guide member 52 and between end post 51 and guide member 53, respectively. Each of the end posts 50 and 51 has an upright portion 55, a top portion 56, and a bottom portion 57 forming a C-shaped member. In the illustrated structure the top portion 56 is perpendicular to the upright portion 55 and parallel with the rail 54. The bottom portion 57 is also perpendicular to the upright portion 55 and parallel with the rails 54. The ends 60 and 61 of the top portions 56, the bottom portions 57 respectively are suitably connected to the channel shaped guide members 52 and 53 as by welding.

Spaced apart elongate bars 62 are connected to the ends 60 on the guide members 52 and 53 so the overhead gate 6 passes therebetween. A flat elongate plate 63 is connected to the lower ends 64 and 65 of the guide members 52 and 53 respectively. The plate 63 is horizontal and extends between the lower ends 64 and 65 to close the space between the guide members 52 and 53 to limit the downward travel of the overhead gate 6.

The overhead gate 6 consists of a pair of vertical side members 66 and 67 which travel in the guide members 52 and 53 respectively and a plurality of horizontal rails 68 extending between the side members 66 and 67 in vertical spaced relation and suitably connected thereto as by welding. Certain livestock will enter and leave through the overhead gate 6 by use of ramps (not shown) while others, such as horses, can jump onto the bed 13 without the use of a ramp; however it is necessary to open the entire gate 5 for horses as will be explained later.

A first pulley 69, a second pulley 70 and a rope 71 are employed to raise and lower the overhead gate 6. The first pulley 69 is suitably secured between the two lowest rails 68 as by being fastened between a pair of vertical bars 72 and 73 which are welded to opposite sides of the two lowest rails 68. The second pulley 70 is secured to the guide member 52 adjacent the spaced apart bars 62. The rope 71 is fastened to the guide member 53 adjacent the spaced apart bars 62 and is reeved over the first pulley 69 and then the second pulley 70 successively. The overhead gate 6 is illustrated in a closed position in FIG. 1. The gate 6 may be raised to an open position (not shown) and lowered to the closed position by use of the rope 71. The gate 6 may be retained in an open position by tying the free end 74 of the rope 71 to the bottom portion 57.

The end posts 50 and 51 may have ends 61 connected to ends 64 and 65 of the guide members 52 and 53 respectively, when the width between the side panels 10 and 11 is the same as the width of the rear end gate 5; however, to provide for different widths between the side panels 10 and 11 a pair of removable bottom sections 75 and 76 and a pair of fixed bottom sections 77 and 78 are shown installed on the lower portion of the rear end gate 5. The sections 75 and 76 may be removed to compensate for narrower tail gates (not shown) of some models of pickup trucks 8.

The removable bottom sections 75 and 76 each have a rectangular frame 79 having top and bottom members 80 and 81, side members 82 and 83, and a vertical intermediate member 84. The fixed bottom sections 77 and 78 each have an extension 85 of the plate 63, a vertical side member 86, a top member 87, and an intermediate member 88. The top members 80 are fastened to the bottom portions 57 by bolts or screws 89 and the side members 83 are fastened to the side members 86 by bolts or screws 90. Each extension 85, side member 86, and top member 87 are welded together and end 91 of each top member 87 is suitably connected to the guide members 52 and 53 respectively to form rigid sections 77 and 78.

The rear end gate 5 is adapted to be swung from either side wall 3 or 4 by adjustable hinge structures 92. Each hinge structure 92 includes a mounting 93 on each side wall 3 and 4 adjacent the rear end post 28, said mounting having arms 94 extending therefrom and cooperating, with ears 95 on the end posts 50 and 51 of the rear end gate, in receiving a respective hinge pin 97 forming the pivotal connection. The ears 95 are in vertically spaced pairs on the end posts 50 and 51 with the ears of each pair having substantially the same spacing as those of other pairs. Also the pairs of ears are fixed to the posts and extend in diverging relation with each pair being at an approximately forty-five degree angle to the plane of the end gate.

In the illustrated structure each mounting 93 has an angle 98 having one leg 99 engaging the rail members 32 and suitably secured thereto with the other leg 100 extending outwardly from the respective side wall toward the other. A pair of holes 101 are in vertical spaced relation in top and bottom portions of the leg 99. A U-bolt 104 is inserted in each pair of holes 101 and embraces one of the rail members 32 to secure the angle 98 to the rail. The mountings 93 include arms 94 suitably secured as by welding to the angle 98 adjacent the top and bottom portions thereof with the arms 94 preferably bisecting the angle between the legs 99 and 100. The arms 94 each have a free end 105 with an arcuate slot 106 therein radially spaced from a hole 107 in which is mounted a pivot pin 108. A second arm or extension 109 is pivotally mounted on respective pin 108 to extend at selective angles therefrom. A fastening member 110 extends through the slot 106 and is connected to the second arm 109 to secure same in selected position relative the arm 94. The ears 95 and free ends of arms 109 have aligned openings 111 and 112 respectively through which the hinge pin 97 extends to hold the rear end gate relative the respective mounting 93 and side wall.

The hinge pin 97 is an elongate rod having a main body portion 114 which is straight and an upper end portion 115 which is U-shaped and connected to the main body portion 114 by an offset portion 116. The upper end portion 115 has a free leg 117 and a leg 118 connected to the offset portion. The free leg 117 and the main body portion 114 are in alignment and are mounted in the openings 111 and 112. A stop or cotter pin 119 is mounted in the main body portion 114 between the lower pair of ears 95 to restrict the upward and downward movement of the hinge pin 97 to the distance between the pair of ears 96 and said distance is such relative to the length of the pin extending downwardly below the arms 109 that when the hinge pin is raised to engage the stop 119 with the upper of the pair of ears 95 the pin ends are above the arms 109 and that end of the rear end gate is released so the gate can swing outwardly on the other hinge pin 97.

The pivoting of the arms 109 about the pivot pins 108 and about the hinge pin 97 accommodates a change of width or spacing between side walls 3 and 4, as for example, from a minimum of sixty-eight inches to a maximum of seventy-three inches. If additional lateral spacing is desired, one or more spacers (not shown) may be installed between one or both of the hinge angle members 98 and the respective rail members 32. It is preferred that wood 2 x 4's be used as spacers with the number depending on the width desired.

In mounting the rack on a pickup, the side walls are adjusted to a proper length and the stakes 44 inserted in sockets in the side panels 10 and 11. Screws 43 are then used to secure the side walls to said panels. The U-bolts 34 are then tightened on the rails 32 in abutting engagement with the rails 31. The front end panel 12 is then turned to a desired relation of the arms 26 and the sleeves 46 are rotated to register the ear 47 thereof with the respective arm 26 and secured by the bolt or fastener 48. The mountings 93, with spacers if necessary, are secured to the rails 32 of the side walls 2 and 3 and then the rear end gate is moved into position and the arms 109 swing to whereby the hinge pins 97 engage the holes 111 and 112 to connect same to the arms 109. The fastener members 110 are then secured holding the arms 109 in the position relative to the arms 94 that accommodated the width of the rack. The assembly is then ready for use.

It is to be understood that while certain forms of this invention have been illustrated and described, it is not to be limited to the specific form or arrangement of parts herein described and shown except insofar as such limitations are included in the claims.

What I claim and desire to secure by Letters Patent is:

1. A stock rack for vehicle bodies including:
    (a) a front end panel,
    (b) a pair of side walls, each having a front end and a rear end, a front end post and a rear end post, a plurality of telescoping pairs of rail members, said rail members having opposite ends of each pair fixedly mounted on the front and rear end post, respectively, and means secured to the rail members to retain the side walls in selected extended position,
    (c) spaced arms mounted on the front end of each side wall and extending therefrom,
    (d) means on the respective ends of the front end panel connected to said arms to secure the front end panel to said side walls, one of said connected arms and means being movable relative an end of a wall and panel to change the spacing between the side walls and position thereof relative to the front end panel,
    (e) an intermediate brace on said rails,
    (f) support flanges mounted on the front and rear end posts, said flanges engaging said vehicle body,
    (g) front and rear end post extensions, said extensions extending into the vehicle body,
    (h) the means securing the rail member being a plurality of U-bolts mounted in the intermediate brace, said U-bolts each embracing a smaller rail member adjacent the free end of a larger rail member, whereby the side wall is retained in the longitudinally adjusted position to conform to the length of the vehicle body.

2. A stock rack as set forth in claim 1 including:
    (a) a rear end gate,
    (b) an adjustable hinge means mounted on the rear end of each side wall, said hinge means being connected to respective end of the rear end gate whereby the rear end gate is selectively swingable from the side walls.

3. A stock rack as set forth in claim 2 wherein said rear end gate includes:
    (a) a pair of end posts each having a top and bottom,
    (b) a pair of intermediate guide members, said intermediate guide members each being connected to the other at the top and bottom thereof,
    (c) a plurality of horizontal rails, said rails each having opposite ends fixedly mounted on an end post and on an adjacent intermediate guide member and said rails being mounted in vertical spaced relation,
    (d) a vertical guide slot mounted in each intermediate guide member, said slots being in opposed relation,
    (e) an overhead gate slidably mounted in the vertical guide slots, said overhead gate having a top and a bottom and an open and closed position,
    (f) a first pulley mounted adjacent the bottom of the overhead gate,
    (g) a second pulley mounted on one of the intermediate guide members adjacent the top of the overhead gate when in the closed position,
    (h) an elongate flexible member connected to the other intermediate post adjacent the top of the overhead gate when in the closed position, said flexible member being reeved over the first pulley and the second pulley whereby the overhead gate is pulled vertically thereby to the open position, 4. A stock rack as set forth in claim 2 wherein said adjustable hinge means includes:
(a) a hinge support member mounted in an upright position on said rear end of each of said side walls,
(b) a plurality of arms each having one end fixedly mounted to the support member with said arms being adjacent the top and bottom of the hinge support member, said arms extending from the support members at an angle with the side wall,
(c) a plurality of second arms each pivotally mounted on the free end of one of the fixed first named arms,
(d) an arcuate slot in the free end portion of each of the fixed arms and radially of the pivotal axis of the mounting of the respective second arm,
(e) an adjustable fastening means mounted on the fixed arms and extending through said arcuate slot in a second arm, to secure the second arm in suitable location,
(f) said adjustable hinge means being an elongate hinge pin mounted in the alignable openings whereby the rear gate is swingable from either side wall and the rear ends of the side walls are adjustable laterally to conform to the width of the vehicle body by adjustment in the position of the second arms.

5. A stock rack as set forth in claim 4 wherein said hinge mounting member is an angle, said first named arms bisecting the angle between legs of the angle, and the sleeving means is a plurality of U-bolts securing the angle to the side walls.

6. A stock rack for vehicle bodies including:
(a) a front end panel having a pair of spaced end posts, a plurality of horizontal telescoping pairs of rails with each having a longer and smaller rail with one end of the smaller rail received with the adjacent end of the longer rail and having opposite ends fixedly mounted on respective end posts,
(b) an intermediate brace, a plurality of U-bolts mounted in the intermediate brace, said U-bolts each embracing a smaller rail and abutting the free end of a larger rail to prevent shortening of the front end panel,
(c) a pair of side walls, each having a front end and a rear end,
(d) spaced arms mounted on the front end of each side wall and extending therefrom,
(e) means on the respective ends of the front end panel connected to said arms to secure the front end panel to said side walls, one of said connected arms and means being movable relative to an end of a wall and panel to change the spacing between the side walls and position thereof relative to the front end panel.

7. The stock rack as set forth in claim 6 wherein said intermediate brace is welded to said free end of said larger rails and said U-bolts each engage one of said smaller rails, whereby said front end panel is retained in each selected longitudinally adjusted position.

8. A stock rack for vehicle bodies including:
(a) a front end panel,
(b) a pair of side walls, each having a front end post and a rear end post,
(c) a plurality of annular flanges mounted on each of said side wall front end posts, said annular flanges being in pairs with the pairs in vertically spaced relation thereon,
(d) a plurality of sleeves pivotally mounted on each of the side wall front end posts, one of said sleeves on each side wall being retained between a pair of annular flanges,
(e) a plurality of elongate outstanding sleeve ears each fixedly mounted on one of the sleeves,
(f) elongate arms mounted on the respective ends of the front end panel and outstanding therefrom with opposed arms diverging from a line normal to the plane of the front end panel,
(g) means pivotedly connecting the sleeve ears on the side wall front end posts to respective arms on an adjacent end of the front end panel whereby the sleeve and ears thereon are movable relative to an end of a wall and panel to change the spacing between the side walls and position thereto relative to the front end panel.

References Cited

UNITED STATES PATENTS

| | | | |
|---|---|---|---|
| 3,365,230 | 1/1968 | Langdon | 296—3 |
| 3,009,212 | 11/1961 | Makens | 296—27 X |
| 2,720,414 | 10/1955 | Hart | 296—3 X |
| 1,781,208 | 11/1930 | Youngblood | 296—36 |

PHILIP GOODMAN, Primary Examiner

U.S. Cl. X.R.

296—24